United States Patent [19]

Ichikawa et al.

[11] Patent Number: 4,743,786
[45] Date of Patent: May 10, 1988

[54] ROTATIONAL POSITION DETECTION DEVICE

[75] Inventors: Wataru Ichikawa, Tokyo; Yuji Matsuki, Saitama; Takeo Maruyama, Tokyo, all of Japan

[73] Assignee: Kabushiki Kaisha SG, Tokyo, Japan

[21] Appl. No.: 799,608

[22] Filed: Nov. 19, 1985

[30] Foreign Application Priority Data

Nov. 20, 1984 [JP] Japan ............................... 59-243362
Aug. 26, 1985 [JP] Japan ............................... 60-185911

[51] Int. Cl.$^4$ ........................................... H02K 39/00
[52] U.S. Cl. ...................................... 310/111; 310/168; 310/171
[58] Field of Search ............... 310/111, 168, 169, 160, 310/159, 166, 171

[56] References Cited

U.S. PATENT DOCUMENTS

| | | | |
|---|---|---|---|
| 1,607,287 | 11/1926 | Laffoon | 310/169 |
| 1,642,041 | 9/1927 | Nyman | 310/169 |
| 1,773,074 | 8/1930 | Borreson | 310/171 UX |
| 2,796,542 | 6/1957 | Bekey et al. | 310/168 X |
| 3,281,655 | 10/1966 | Blasingame | 323/51 |
| 3,281,825 | 10/1966 | Corl et al. | 340/347 |
| 3,486,054 | 12/1969 | Livingston | 310/171 |
| 4,121,112 | 10/1978 | Hartig | 310/168 X |
| 4,405,896 | 9/1983 | Akita | 324/208 |

*Primary Examiner*—Donovan F. Duggan
*Attorney, Agent, or Firm*—Spensley Horn Jubas & Lubitz

[57] ABSTRACT

This rotational position detection device comprises a stator section including primary and secondary windings and a rotor section disposed in such a manner that it is capable of performing relative rotational displacement with respect to the stator section. A conductive substance portion is provided in the form of a predetermined pattern. The amount of flux passing through the conductive substance portion of the rotor section changes in accordance with a relative rotational position of the rotor section with respect to the stator section and therefore an eddy current flows through the conductive substance portion. Reluctance is caused to change by a loss due to this eddy current and a secondary output signal corresponding to the rotational position is produced in the windings of the stator section. The pattern of the conductive substance portion can be formed easily by using electro-plating or other surface processing technique. The rotor section may be of a shape such that the rate of the reluctance change is enhanced by the combination of the magnetic substance portion and the conductive substance portion.

10 Claims, 9 Drawing Sheets

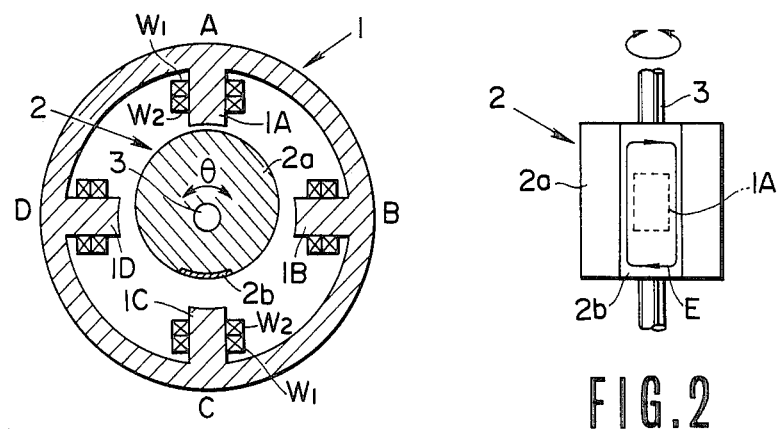
FIG.1
FIG.2
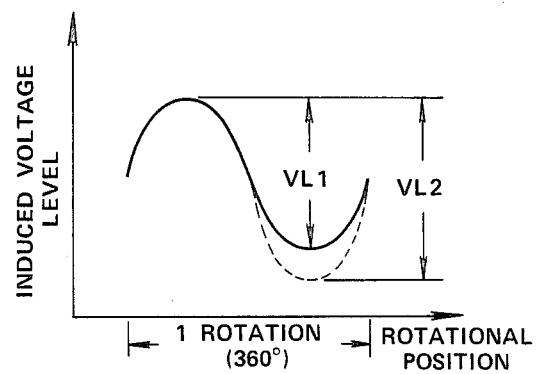
FIG.3
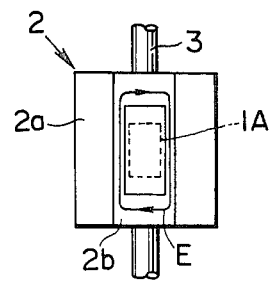
FIG.4
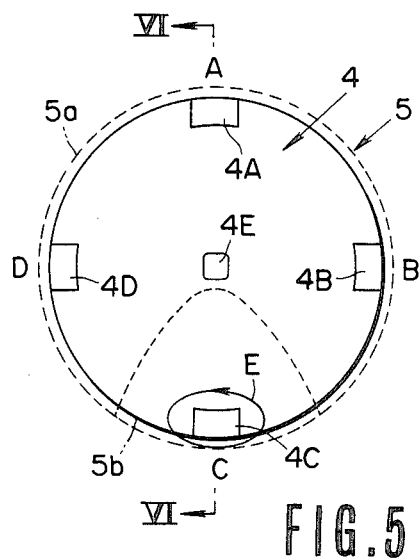
FIG.5
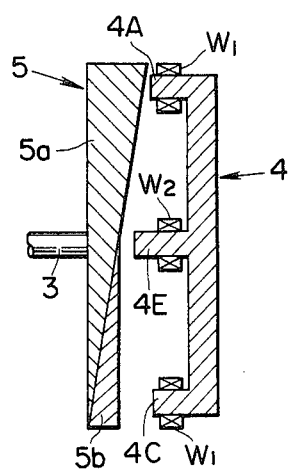
FIG.6

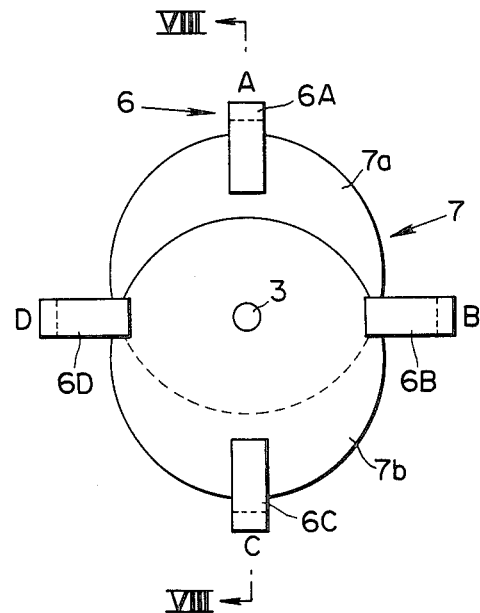
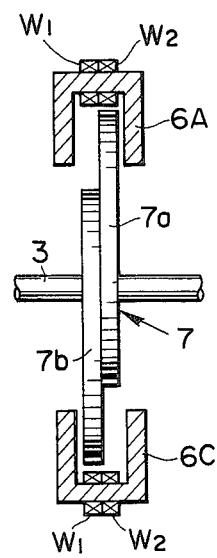
FIG.7  FIG.8
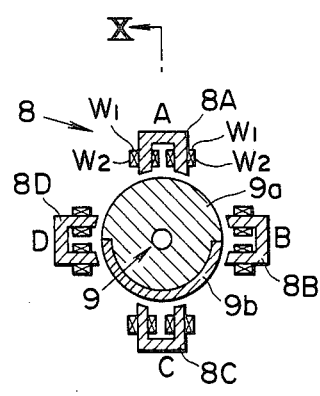
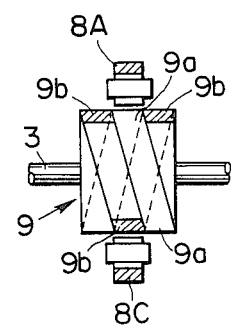
FIG.9  FIG.10

ROTATIONAL POSITION DETECTION DEVICE

BACKGROUND OF THE INVENTION

This invention relates to an induction type (more specifically variable reluctance type) rotational position detection device having primary and secondary windings provided on the stator side and no windings on the rotor side and, more particularly, to a rotational position detection device capable of producing change in the coefficient of induction by using eddy current loss as a parameter. This invention further relates to a rotational position detection device capable of producing an enhanced change in the coefficient of induction by using both reluctance change (permeance change) and eddy current loss as parameters thereby realizing a high-precision detection.

As an induction type rotational position detection device of a type having primary and secondary windings provided on the stator side and no windings on the rotor side, there is known a rotary type differential transformer called microsyn which produces an output signal having a voltage level responsive to a rotational position. There is also known a detection device as disclosed in Japanese Preliminary Patent Publication No. 70406/1982 which is of a type outputting an AC signal having an electrical phase angle corresponding to the rotational position. Such prior art detection devices realize change in the coefficient of induction in a coil in response only to reluctance change (permeance change) caused by displacement of a magnetic substance member.

Due to this construction, accuracy of detection in these prior art devices is limited. Further, magnetic substance material must be processed into a predetermined shape to produce a rotor and this requires a complicated processing work. Besides, since the rotor is made by machining work, reduction in size and cost is also limited.

SUMMARY OF THE INVENTION

It is therefore an object of the invention to provide a rotational position detection device which increases the accuracy in detection.

It is another object of the invention to provide a rotational position detection device which can be processed in a simple manner and can be made compact without difficulty.

It is still another object of the invention to provide a rotational position detection device including a rotor of a novel construction capable of reducing the manufacturing cost of the rotor.

For achieving the above described various objects of the invention, it is a feature of the rotational position detection device according to the invention that the device comprises a stator section including winding means being excited by a primary AC signal for producing a secondary output and a rotor section disposed in such a manner that it is capable of performing relative rotational displacement with respect to the stator section and a conductive substance portion of a predetermined pattern is disposed in the rotor section.

As the conductive substance pattern portion enters into the magnetic field provided by the winding means of the stator section, an eddy current flows in this portion and reluctance of the magnetic circuit of the winding means is caused to substantially increase due to eddy current loss. The amount of eddy current changes with the degree of entry of the conductive substance pattern with resulting change in the reluctance. Accordingly, a secondary output is produced in the winding means which output is responsive to the relative rotational position of the conductive substance pattern of the rotor section with respect to the stator section.

Since the eddy current tends to flow through a portion near the surface of conductive substance, the conductive substance pattern to be provided on the rotor section is not required to have a large thickness. The conductive substance portion therefore can be attached in a predetermined pattern on a base member of the rotor section. This means facilitating of manufacture of the rotor section. That is, the pattern of such relatively thin conductive substance portion can be formed on the base member of the rotor section relatively easily by using plating, flame spraying, pattern baking, etching or other suitable surface processing technique. It is therefore possible to obviate the complicated machining work required in machining the magnetic substance portion into a desired shape and reduction in the cost of manufacture can be expected. Besides, the device can thereby be made compact.

In a case where the reluctance is caused to change using the eddy current loss only as a parameter as described above, the base member of the rotor section need not be made of a magnetic substance (e.g., iron) but it may be made of a light material such as plastic or synthetic resin. This enables the rotor to be made light and thereby helps reduction of torque applied to an object of detection. Technique of making a coil thin by forming it on a printed circuit board is known and this technique can be advantageously combined with the light and compact rotor section made according to the invention as described above by applying such technique to the winding means in the stator section. By such combination, the detection device as a whole can be made compact and light.

Conversely, it is also useful to have the base member of the rotor section made of a magnetic substance. In this case, increase in the amount of flux passing through the conductive substance pattern can be realized due to existence of the magnetic substance portion so that accuracy in detection can be further increased. In this case, an arrangement may be made so that the reluctance change responsive to the rotational position is not produced by only the magnetic substance portion constituting the rotor section. For increasing the accuracy in detection, however, an arrangement should preferably be made so that the reluctance change responsive to the rotational position is produced by the magnetic substance portion of the rotor section itself.

It is therefore a feature of the rotational position detection device according to the invention that the device comprises a stator section and a rotor section as described above wherein the rotor section includes a magnetic substance portion of a configuration capable of changing reluctance (i.e., permeance) of a magnetic circuit passing through the winding means in response to relative rotational change with respect to the stator section and a conductive substance portion which is provided in a location in which the reluctance change is caused to relatively increase (i.e., permeance is caused to relatively decrease) in such a manner that an eddy current path is formed relative to flux and which is made of substance which is relatively weak magnetic or non-magnetic and relatively conductive as compared with the magnetic substance portion. By providing the conductive substance portion in a location in which the reluctance is caused to relatively increase due to absence or reduction of the magnetic substance portion, the eddy current loss is produced in this portion and substantial reluctance is further increased. Thus, change in the coefficient of induction (since the number of windings of the winding means and other conditions are fixed, the change in the coefficient of induction is equivalent to the reluctance change) is produced in an enhanced manner by using as parameters not only the reluctance change (permeance change) due to the displacement of the magnetic substance portion but the eddy current loss due to displacement of the conductive substance portion. In other words, the influence of the eddy current loss due to the conductive substance portion does not extend to the range in which the reluctance is caused to relatively decrease (i.e., the range in which permeance is caused to relatively increase) so that voltage of a relatively sufficiently high level can be induced on the secondary side. On the other hand, in the range in which reluctance is caused to relatively increase, the eddy current loss due to the conductive substance portion is produced and the reluctance change is enhanced so that the voltage level induced on the secondary side is further reduced. Accordingly, difference between a high level and a low level in the voltage induced in the secondary side, i.e., width of difference in the secondary output relative to displacement, can be made sufficiently large and an accurate detection of displacement thereby can be realized.

Embodiments of the invention will now be described with reference to the accompanying drawings.

BRIEF DESCRIPTION OF THE DRAWINGS

In the drawings,

FIG. 1 is a diametrical section showing an embodiment of the rotational position detection device according to the invention;

FIG. 2 is a side view showing an example of a rotor section of the embodiment;

FIG. 3 is a graph showing relationship between the secondary output voltage level and the rotational position in this embodiment;

FIG. 4 is a side view showing a modified example of the rotor section in the same embodiment;

FIG. 5 is a schematic front view of another embodiment of the invention;

FIG. 6 is a section taken along lines VI—VI in FIG. 5;

FIG. 7 is a schematic front view showing another embodiment of the invention;

FIG. 8 is a section taken along lines VIII—VIII in FIG. 7;

FIG. 9 is a diametrical section showing another embodiment of the invention;

FIG. 10 is a section taken along lines X—X in FIG. 9;

DESCRIPTION OF PREFERRED EMBODIMENTS

Figure 11:
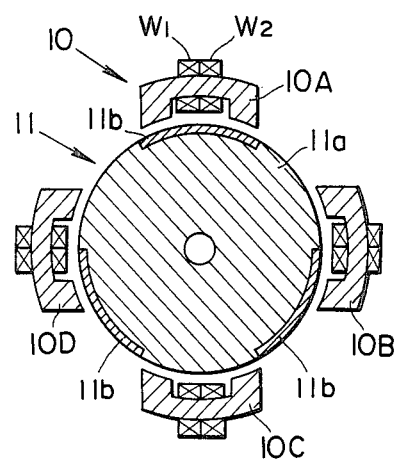
FIG. 11 is a diametrical section showing another embodiment of the invention.

Referring first to FIG. 1, a stator section 1 comprises four pole portions 1A–1D corresponding to four phases A–D disposed at an interval of 90° in the circumferential direction. A primary winding $W_1$ and a secondary winding $W_2$ are respectively wound on each of the pole portions 1A–1D. Cores of the respective pole portions 1A–1D of the stator section 1 are made of common magnetic substance. The end portions of the pole portions 1A–1D faces inwardly and a rotor section 2 is disposed within space enclosed by these end portions. The rotor section 2 comprises a cylindrical magnetic substance portion 2a which is offset from a rotation axis 3. Reluctance of a magnetic circuit passing through the respective pole portions 1A–1D is changed in accordance with the rotation angle due to the offset shape of the magnetic substance portion 2a. More specifically, distance of an air gap between the cylindrical side surface of the magnetic substance portion 2a and the respective end portions of the pole portions 1A–1D changes with the rotation angle $\theta$ and reluctance (or permeance) change corresponding to trigonometrical function for one cycle per one rotation of the rotor section 2 is produced in the respective phases A–D.

The rotor 2 includes, in a portion in which the distance from the rotation axis 3 is the shortest (i.e., in a portion in which reluctance is caused to relatively increase) in the cylindrical side surface of the magnetic substance portion 2a, a conductive substance portion 2b made of a weak magnetic or non-magnetic substance. As shown in FIG. 2, this conductive substance portion 2b has an area which is substantially the same as or slightly larger than the area of each of the stator pole portions 1A–1D and is capable of forming an eddy current path as shown by a line E in FIG. 2 relative to flux passing between the pole portions 1A–1D and the magnetic substance portion 2a.

The larger the area of the conductive substance portion 2b facing the end surface of the stator pole portions 1A–1D (e.g. the state of the phase C in FIG. 1 at the maximum) is, the larger is the eddy current which flows through the conductive substance portion 2b with a result that the reluctance of the magnetic circuit passing through the pole portion facing the conductive substance portion 2b (e.g. 1c in the state of FIG. 1) is increased due to eddy current loss. On the other hand, as will be apparent from the foregoing description, in a state in which one of the stator pole portions 1A–1D faces the conductive substance portion 2b, the gap between the pole (1c in FIG. 1) and the magnetic substance portion 2a of the rotor section 2 is the largest and the reluctance of the magnetic circuit passing through this pole portion is caused to relatively increase. The increase in the reluctance therefore is enhanced and attenuation in the level of induced voltage of the secondary winding $W_2$ in that pole portion is enhanced.

As the conductive substance portion 2b is spaced away from any one of the stator pole portions 1A–1D, the gap between that pole portion and the magnetic substance portion 2a is reduced and the reluctance thereby is decreased. In a state in which the gap between the pole portion 1A and the magnetic substance portion 2a is at the minimum as in the phase A shown in FIG. 1, the magnetic reluctance becomes minimum and the level of the induced voltage in the secondary winding $W_2$ of the pole portion 1A becomes maximum.

The above described phenomenon will now be illustrated schematically. The level of the induced voltage due only to the magnetic substance portion 2a in the secondary winding $W_2$ of a certain phase with respect to the rotational displacement within one rotation (360°) is as shown by the solid line in FIG. 3. In a portion in which this level is relatively attenuated, the attenuation in the level of the induced voltage due to the eddy current loss of the conductive substance portion 2b is added as shown in the dotted line. Thus, the width of the variation in the level of the induced voltage with respect to the rotational displacement (e.g. VL1, VL2) becomes larger in the case where both the magnetic substance portion 2a and the conductive substance portion 2b contribute to the variation in the level (i.e., VL2) than in the case where the magnetic substance portion solely contributes to such variation (i.e., VL1).

In the case of FIG. 2, the conductor portion 2b is of a plate-like configuration but it may be of an annular configuration as shown in FIG. 4 or of any configuration which is capable of forming an eddy current path.

In embodiments shown in FIGS. 5 and 6, the end portions of respective pole portions 4A–4D and 4E of a stator section 4 are directed in the direction parallel to the rotation axis 3. The primary windings $W_1$ only are wound on the pole portions 4A–4D corresponding to the respective phases A–D which are disposed at an interval of 90° in the circumferential direction whereas the secondary winding $W_2$ only is wound on the pole portion 4E disposed in the center. A rotor section 5 comprises a disk-like magnetic substance portion 5a having a sloping surface which is opposed to the end portions of the stator pole portions 4A–4E. A conductive substance portion 5b is provided in a portion where the gap between the magnetic substance portion 5a and the pole portions 4A–4E is large. The flux passes from the respective pole portions 4A–4D to the central pole portion 4E through the rotor section 5. The eddy current path passing through the conductive substance portion 5b is shown by the line E in FIG. 5. Owing to this construction, this embodiment operates in the same manner as the one shown in FIG. 1 and increase in the reluctance can be enhanced in a portion in which the reluctance increases.

In the embodiment shown in FIGS. 7 and 8, each of pole portions 6A–6D corresponding to phases A–D of a stator section 6 is made of an independent magnetic substance core of a C shape for each phase. In the embodiments of FIGS. 1, 2, 5 and 6, the magnetic circuit in each pole portion is coupled to other pole portion through the rotor section whereas in the embodiment of FIGS. 7 and 8 in which the independent cores are provided for the respective phases, the magnetic circuit of each pole portion is formed in such a manner that it passes from one end portion of the pole portion to the other end portion through the rotor section. Primary and secondary windings $W_1$ and $W_2$ are wound on the respective pole portions 6A–6D.

The rotor section 7 comprises a disk-like magnetic substance portion 7a which is offset from the rotation axis 3 and a disk-like conductive substance portion 7b which is offset from the rotation axis 3 in a location shifted from the magnetic substance portion 7a by 180°. As shown in FIG. 8, the rotor section 7 is disposed in such a manner that its peripheral portion can enter the space between the two legs of each of the pole portions 6A–6D. Since the offsetting of the magnetic substance portion 7a and the conductive substance portion 7b is shifted by 180°, when the magnetic substance portion 7a has entered to the greatest degree in one of the pole portions 6A–6D, the conductive substance portion 7b has not entered it at all and, conversely, when the conductive substance portion 7b has entered the pole portion to the greatest degree, the magnetic substance portion 7a has not entered it at all. In a state in which the conductive substance portion 7b has entered the space between the two legs of any of the pole portions 6A–6D (e.g., the state in which it has entered the pole portion 6C in FIGS. 7 and 8), the largest eddy current flows. In this state, the magnetic substance portion 7a has not entered between the legs of the pole portion 6C at all so that the reluctance is caused to increase. Accordingly, as in the previously described embodiments, the increase in the reluctance is enhanced. The conductive substance portion 7b need not be made of a conductive substance in its entirety but the conductive substance may be used partially so as to enable the eddy current path to be formed (e.g., annularly along the periphery of the disk).

In the embodiment shown in FIGS. 9 and 10 also, each of pole portions 8A–8D corresponding to phases A–D of a stator section 8 is made of a C-shaped independent magnetic substance core for one phase and primary and secondary windings $W_1$ and $W_2$ are wound on the respective pole portions 8A–8D. A rotor section 9 which is inserted in a space enclosed by the end portions of the stator pole portions 8A–8D is generally of a cylindrical shape and a spiral magnetic substance portion 9a and a spiral conductive substance portion 9b are alternately provided in the form of a single thread screw. The crest portion of the screw corresponds to the magnetic substance portion 9a and the conductive substance portion 9b is provided in the valley portion of the screw. In FIG. 10, for convenience of illustration, the crest portion (i.e. magnetic substance portion 9a) and the valley portion of the screw are shown in a side view and the conductive substance portion 9b which is filled in this valley portion is shown in section. The core portion of the rotor 9 may be made of the same magnetic substance as the crest portion of the screw. The larger the area of the end portion of each of the pole portions 8A–8D facing the magnetic substance portion 9a of the rotor section 9 is, the smaller is the reluctance. The larger the area of the end portion of each of the pole portions 8A–8D facing the conductive substance portion 9b is, the larger is the reluctance. Since the magnetic substance portion 9a and the conductive substance portion 9b are alternately provided in the form of a single thread screw, the areas of the magnetic substance portion and conductive substance portion facing these pole portions change in accordance with the rotational position thereof with a result htat this embodiment operates in the same manner as the previously described embodiments and an enhanced reluctance change thereby is obtained.

In the above described embodiments, the cycle of the reluctance change in the respective pole portions is one cycle for each rotation. In an embodiment shown in FIGS. 11 and 12, this cycle is three cycles for each rotation. As in the above described embodiments, pole portions 10A–10D of a stator section 10 are made of C-shaped magnetic substance cores which are independent for the respective phases. Primary and secondary windings $W_1$ and $W_2$ are wound on the respective pole portions 10A–10D. A rotor section 11 inserted in a space enclosed by the end portions of the stator pole portions 10A–10D is generally of a cylindrical shape including a gear wheel-like magnetic substance portion 11a with three teeth and a three-piece conductive substance portion 11b filled in the recesses between the respective teeth. As viewed in the peripheral surface of the rotor section 11, the magnetic substance portion 11a and the conductive substance portion 11b are alternately arranged at an angle of 60° so that the reluctance change in each of the stator pole portions 10A–10D is produced with the rotation range of 120° constituting one cycle of the reluctance change. Accordingly, the reluctance change of three cycles for each rotation is produced. Since the conductive substance portion 11b is provided in a location where reluctance increases due to the recess of the magnetic substance portion 11a, the reluctance change is enhanced in the same manner as in the above described embodiments.

Figure 13:
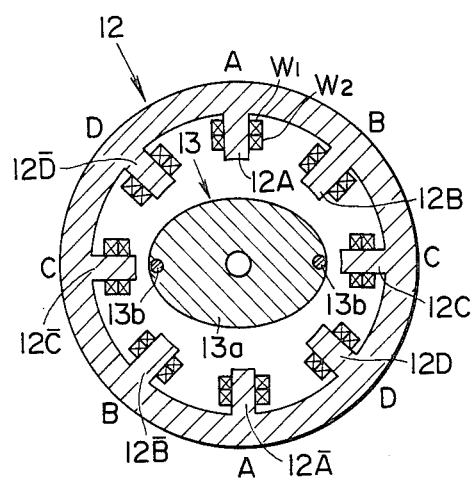
FIG. 13 is a diametrical section of another embodiment of the invention.
Figure 14:
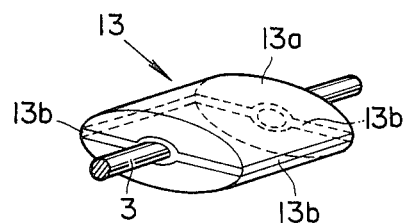
FIG. 14 is a perspective view of a rotor section of FIG. 13.

The embodiment shown in FIGS. 13 and 14 is one in which the reluctance change of two cycles for each rotation is produced. A stator section 12 comprises eight pole portions 12A–12D, $12\overline{A}$–$12\overline{D}$ which are arranged at an interval of 45° in the circumferential direction with the same phase being opposed to each other at an interval of 180°. A rotor section 13 is generally of an elliptic cylindrical shape and comprises a magnetic substance portion 13a of an elliptic cylindrical shape and an annular conductive substance portion 13b wound about the periphery of a plane including the major axis of the elliptic cylinder. Since the magnetic substance portion 13a is of an elliptic cylindrical shape, reluctance change whose cycle consists of half rotation is produced in each of the pole portions 12A–12D and $12\overline{A}$–$12\overline{D}$. On the other hand, since the conductive substance portion 13b constitutes a ring along the major axis of the elliptic cylinder, when certain pole portions (12A and $12\overline{A}$ in the example of FIG. 13) are opposed to the minor axis portion of the magnetic substance portion 13a, the largest eddy current flows in accordance with flux passing through these pole portions. In the pole portions corresponding to this minor axis portion, the gap between the pole portion and the magnetic substance portion 13a becomes maximum and reluctance is caused to increase. Accordingly, the reluctance change is enhanced in the same manner as in the above described embodiments.

Figure 15:
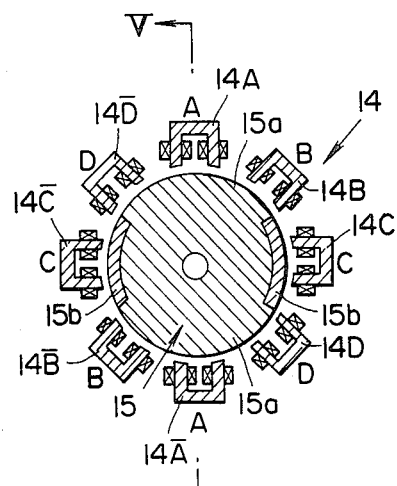
FIG. 15 is a diametrical section of another embodiment of the invention.
Figure 16:
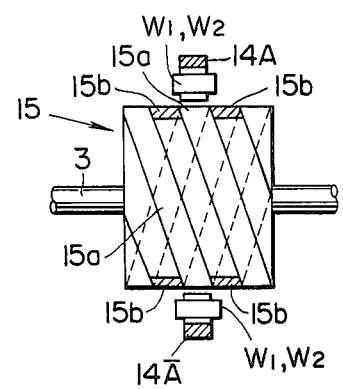
FIG. 16 is a section taken along lines V—V in FIG. 15.

The embodiment shown in FIGS. 15 and 16 is one in which reluctance change of two cycles for each rotation is produced. A stator section 14 comprises eight pole portions 14A–14D and $14\overline{A}$–$14\overline{D}$ each made of an independent magnetic substance core arranged at an interval of 45°. Primary and secondary windings $W_1$ and $W_2$ are wound on the respective pole portions. As in the embodiment of FIG. 13, the two phases are opposed to each other at an interval of 180°. In the example of FIG. 13, the magnetic circuit is formed between the same phases opposed to each other through the rotor section 13 (e.g., a magnetic circuit is formed from the pole portion 12A to the pole portion $12\overline{A}$ through the rotor section 13) whereas in the embodiment of FIG. 15, a magnetic circuit is formed from one end portion of each pole portion to the other end portion of the same pole portion through the rotor section 15.

The rotor section 15 inserted in the space enclosed by the end portions of the respective pole portions 14A–14D is generally of a cylindrical shape and a spiral magnetic substance portion 15a and a spiral conductive substance portion 15b are alternately provided in the form of a double thread screw. The crest portion of the double thread screw constitutes the magnetic substance portion 15a and the conductive substance portion 15b is provided in the valley portion. In FIG. 16, for convenience of illustration, the crest portion (the magnetic substance portion 15a) and the valley portion are shown in a side view and the conductive substance portion which is filled in the valley portion is shown in section. The core portion of the rotor section 15 may be made of the same magnetic substance as the crest portion. Due to the double thread screw construction, the reluctance change due to the change in the area opposing to the magnetic substance portion 15a in a certain pole portion occurs two cycles for each rotation. Since the conductive substance portion 15b is provided in a portion where the reluctance change is relatively increased, the reluctance change is thereby enhanced.

In the respective embodiments described above, the magnetic substance portion of the rotor section should preferably be made of iron or other strong magnetic substance whereas it will suffice for the conductive substance portion if it is made of a material which is relatively weak magnetic or non-magnetic as compared with the magnetic substance portion and also is relatively conductive (such, for example, as copper, aluminum or brass or mixture of such conductive substance and other substance).

In the above described embodiments, an output signal corresponding to the rotational position of the rotor section is obtained by a phase shift system. First, in the embodiments of FIGS. 1–10, one cycle of the reluctance change is produced for each rotation and the phase of this reluctance change is shifted by 90° between respective adjacent phases. Accordingly, the level of voltage induced in the secondary winding $W_2$ of the respective phases A–D can be expressed as $\cos\theta$ in the phase A, $\sin\theta$ in the phase B, $-\sin\theta$ in the phase C and $-\sin\theta$ in the phase D depending upon the rotation angle of the rotor section. The primary windings $W_1$ of the phases A and C and the primary windings $W_1$ of the phases B and D are respectively excited by AC signals which are shifted in phase by 90° from each other (e.g., the phases A and C are excited respectively by a sine wave signal $\sin\omega t$ and the phases B and D are excited by a cosine signal $\cos\omega t$).

In the pair of phases A and C, the output signals of the windings $W_2$ are added differentially and in the pair of phases B and D, the outputs of the secondary windings $W_2$ are also added differentially. The differential output signals of these pairs are added so as to synthesize the final output signal Y. Thus the output signal Y can be substantially expressed in such an abbreviated equation:

$$\begin{aligned}Y &= \sin\omega t\cos\theta - (-\sin\omega t\cos\theta) + \\ &\quad \cos\omega t\sin\theta - (-\cos\omega t\sin\theta) \\ &= 2\sin\omega t\cos\theta + 2\cos\omega t\sin\theta \\ &= 2\sin(\omega t+\theta)\end{aligned}$$

The coefficient in the above equation, for which "2" is placed for the sake of convenience, may be replaced with a constant K, which is determined according to various conditions, to obtain $$Y = K\sin(\omega t+\theta)$$

in which $\theta$ corresponds to the rotational position of the rotor section, so that the rotational position can be detected by determining the phase difference $\theta$ of the output signal Y in relation to the primary AC signal $\sin\omega t$ (or $\cos\omega t$).

Figure 17:
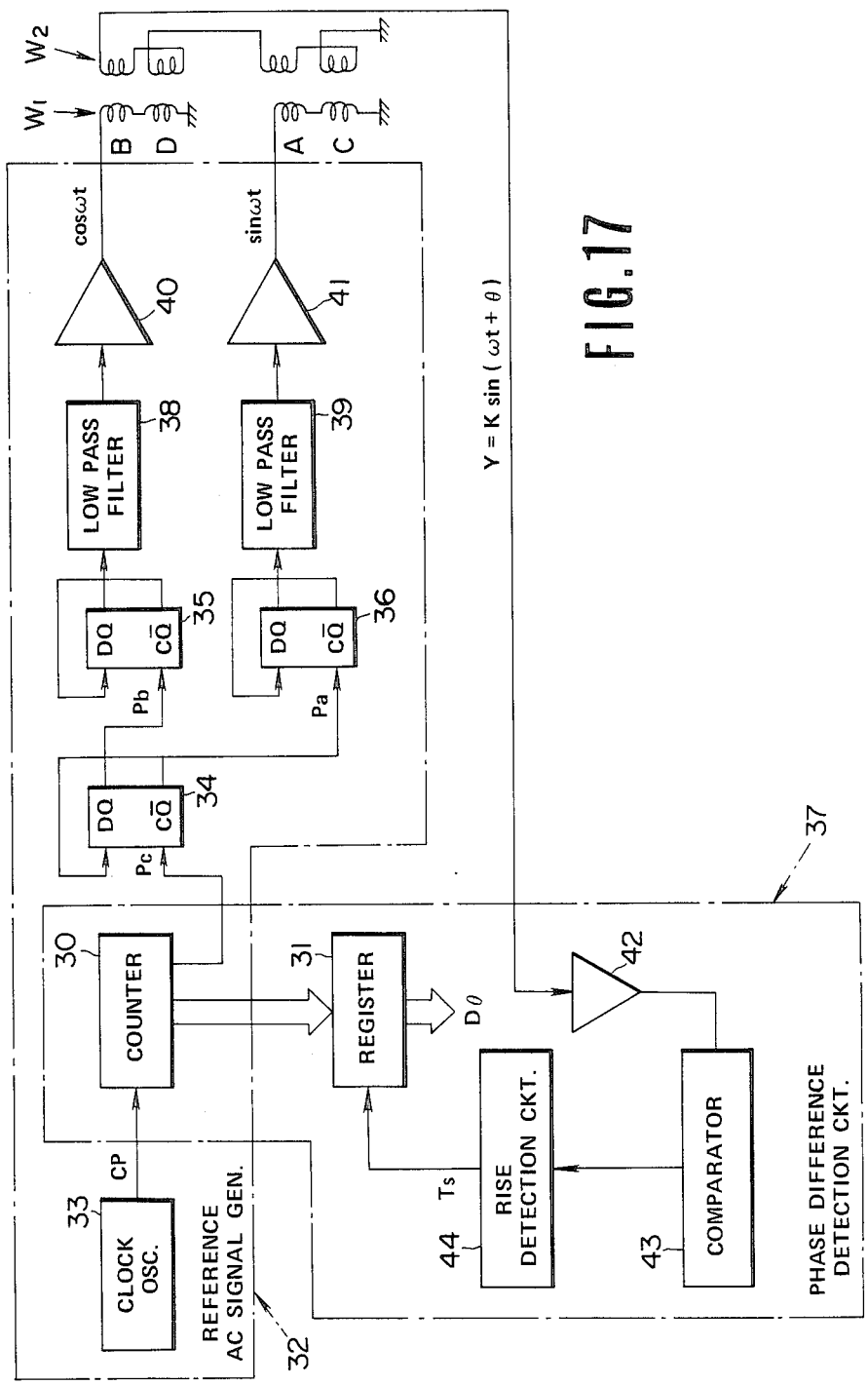
FIG. 17 is a block diagram showing an example of a circuit for operating the rotational position detection device according to the invention by the phase shift system and measuring the amount of electrical phase shifting responsive to the rotational position.

Means for obtaining the phase difference $\theta$ between the output signal Y and the reference AC signal $\sin\omega t$ (or $\cos\omega t$) may be suitably constructed. FIG. 17 shows an example of such circuit in which the phase difference $\theta$ is obtained in a digital value. Though not shown in the figure, the phase difference $\theta$ may also be obtained in an analog value by employing an integration circuit to compute a time difference at a predetermined phase angle (e.g. 0 degree) between the reference AC signal $\sin\omega t$ and the output signal $Y = K\sin(\omega t+\theta)$.

In FIG. 17, a reference AC signal generation circuit 32 is a circuit for generating a reference AC sine signal $\sin\omega t$ and a reference AC cosine signal $\cos\omega t$ and a phase difference detection circuit 37 is a circuit for measuring the phase difference $\theta$. A clock pulse CP generated by a clock oscillator 33 is counted by a counter 30. The counter 30 is of a modulo M, where M is a suitable integer, and its count is provided to a register 31. A pulse Pc which is obtained by 4/M frequency-dividing the clock pulse CP is delivered from a 4/M frequency divided output of the counter 30 and supplied to a C-input of a ½ frequency-dividing flip-flop 34. A pulse Pb provided from a Q output of the flip-flop 34 is applied to a flip-flop 35 and a pulse Pa provided from a Q output of the flip-flop 34 is applied to a flip-flop 36. Output signals of these flip-flops 35 and 36 are processed through low-pass filters 38, 39 and amplifiers 40, 41 whereby the cosine signal $\cos\omega t$ and the sine signal $\sin\omega t$ are obtained and applied to primary windings $W_1$ of respective phases A–D. M counts in the counter 30 corresponds to the phase angle of $2\pi$ radian of these reference signals $\cos\omega t$ and $\sin\omega t$. In other words, 1 count in the counter 30 represents a phase angle of $2\pi/M$ radian.

The synthesis output signal Y of the secondary windings $W_2$ is applied to a comparator 43 through an amplifier 42 and a square wave signal corresponding to the positive or negative polarity of the signal Y is provided by the comparator 43. A rise detection circuit 44 produces a pulse Ts in response to the rise of the output signal of the comparator 43 and the count value of the counter 30 is loaded in the register 31 in response to this pulse Ts. As a result, a digital value $D_\theta$ corresponding to the phase difference $\theta$ is loaded in the register 31. Thus is obtained data $\theta$ indicating in an absolute value the rotational position within one rotation.

Rotational position data in the embodiments of FIGS. 11–16 can also be obtained by the phase shift system in the same manner. Since in the embodiment shown in FIGS. 11 and 12, however, the reluctance change of three cycles per rotation is produced, an output signal $Y = K\sin(\omega t+3\theta)$ is obtained for the actual rotation angle $\theta$ and the digital value $D_\theta$ becomes one which specifies the rotational position within ⅓ rotation in an absolute value. Since in the embodiment of FIGS. 13–16 the reluctance change of two cycles per rotation is produced, an output signal $Y = K\sin(\omega t+2\theta)$ is produced and the digital value $D_\theta$ becomes one which specifies the rotational position within ½ rotation in an absolute value.

The signal processing method is not limited to said phase shift method; as in the ordinary transformer, an analog voltage according to the linear position may be obtained by rectifying the differential output of the secondary coil. In that case, a common primary AC signal may be used for all of the phases A–D and the pole portions may be either one of the phases A, C and B, D.

Referring now to FIGS. 18 through 34, embodiments of the rotational position detection device capable of producing reluctance change by the eddy current loss alone will be described. In these embodiments, the magnetic substance portions between the respective conductive substance portions in the embodiments of FIGS. 1 and 16 may be removed so that the eddy current loss caused by the conductive substance portions only will participate in change in the coefficient of induction (reluctance change).

Figure 18:
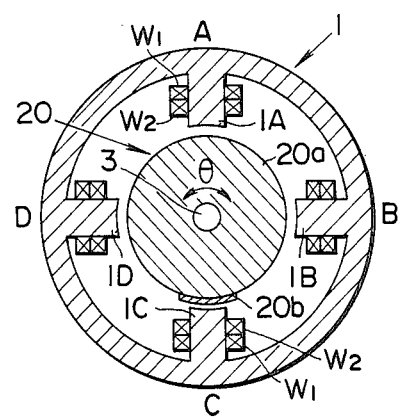
FIG. 18 is a diametrical section showing another embodiment of the rotational position detection device according to the invention.

The detection device shown in FIG. 18 resembles the one shown in FIG. 1, comprising a rotor section 20 which includes a cylindrical base member 20a having a rotation axis 3 and a conductive substance pattern 20b with a predetermined width disposed on the side surface of this base member 20a. This conductive substance pattern 20b consists of an oblong pattern having a width which is substantially the same as or broader than the width of the end portion of the respective stator pole portions 1A–1D and is capable of forming an eddy current path as shown by a line E in FIG. 19 with respect to flux passing between the pole portions 1A–1D and the base member 20a.

In the same manner as described above, the larger the area of the conductive substance pattern 20b facing the end surface of the respective stator pole portions 1A–1D is (e.g., the state of the phase C in FIG. 18 at the maximum), the larger is the eddy current which flows the conductive substance pattern 20b with resulting increase in the reluctance of the magnetic circuit passing through the pole portion facing the conductive substance pattern 20b (e.g., 1c in the state of FIG. 18) due to the eddy current loss. Conversely, little eddy current flows in a state in which the conductive substance pattern 20b is furthest from the magnetic field (e.g., the state of the phase A in FIG. 18). In this manner, the eddy current flows in accordance with the degree of accessing of the conductive substance pattern 20b to the magnetic field of each phase and reluctance change due to the eddy current loss is produced in the magnetic field of each phase. An AC signal of a level corresponding to this reluctance change is induced in the secondary winding $W_2$ of each phase.

Since the poles 1A-1D corresponding to the respective phases A-D are disposed at an interval of 90°, the phase of the reluctance change in the respective phases A-D produced due to the change in the conductive substance pattern 2b is shifted by 90° between adjacent phases. This reluctance change is produced at a rate of one cycle for each rotation of the rotor section 2. Accordingly, the level of voltage induced in the secondary windings $W_2$ of the respective phases A-D can be expressed by $\cos \theta$ in the phase A, $\sin \theta$ in the phase B, $-\sin \theta$ in the phase C and $-\sin \theta$ in the phase D.

For obtaining an output signal corresponding to the rotational position of the rotor section 20 by the phase shift system, the primary windings $W_1$ of the phases A and C and the primary windings $W_1$ of the phases B and D are respectively excited by AC signals which are shifted by 90° in their electrical phase in the same manner as in the above described embodiments. In the same manner as in the above described embodiments, an output signal Y containing an amount of phase shift corresponding to the rotational position $\theta$ of the rotor section 20 is obtained from the secondary winding side and the rotational position is detected by measuring the phase shift $\theta$ of this output signal Y.

Figure 19:
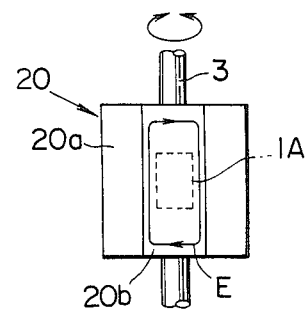
FIG. 19 is a side view showing an example of a rotor section in the embodiment of FIG. 18.

The conductive substance pattern 20b may be formed in an annular shape as the one shown in FIG. 3 instead of being formed in the plate-like configuration as in FIG. 19. The conductive substance pattern 20b may also be formed in any shape capable of forming an eddy current path.

Figure 20:
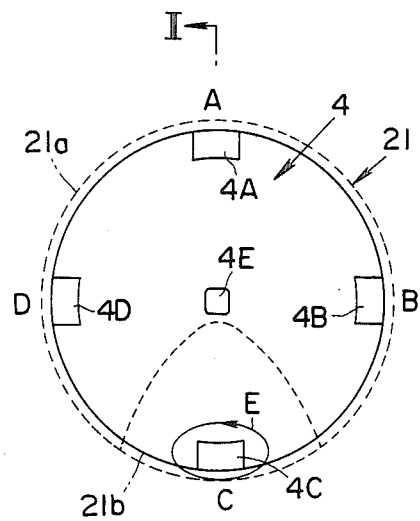
FIG. 20 is a schematic front view showing another embodiment of the invention.
Figure 21:
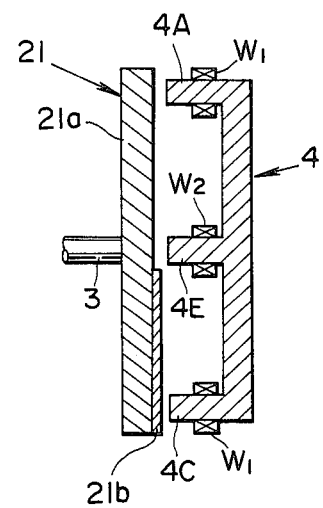
FIG. 21 is a section taken along lines I—I of FIG. 20.

The embodiment shown in FIGS. 20 and 21 resembles the one shown in FIGS. 5 and 6. In a rotor section 21, a conductive substance pattern 21b is disposed at a predetermined location of a disk-like base member 21a. This conductive substance pattern 21b is, for example, of a fan-shape of an angle of about 90°. The end portions of the stator pole portions 4A-4D face the side of the rotor section 21 on which the conductive substance pattern 21b is disposed and flux flows from the respective pole portions 4A-4D to a central pole portion 4E through the rotor section 21. The eddy current path flowing through the conductive substance pattern 21b is shown by a line E in FIG. 20. Owing to this consturction, this embodiment operates in the same manner as in the embodiment of FIG. 18.

Figure 22:
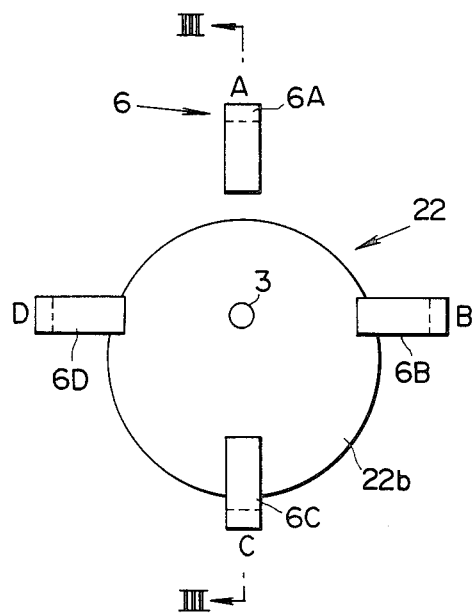
FIG. 22 is a schematic front view showing another embodiment of the invention.
Figure 23:
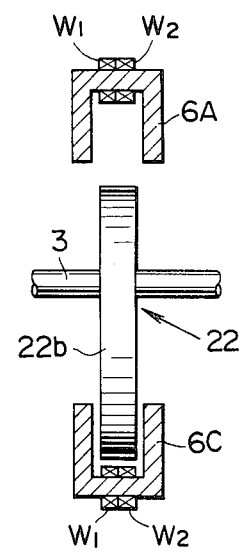
FIG. 23 is a section taken along lines III—III in FIG. 22.

The embodiment shown in FIGS. 22 and 23 resembles the embodiment shown in FIGS. 7 and 8.

A rotor section 22 consists of a disk-like conductive substance portion 22b which is offset from a rotation axis 3. As shown in FIG. 23, the rotor section 22 is disposed in such a manner that its peripheral portion enters between two legs of pole portions 6A-6D. In a state in which the conductive substance portion 22b has entered most deeply between the two legs of the pole portions 6A-6D (e.g., the state in which it has entered 6C in FIGS. 22 and 23), the largest eddy current flows and reluctance change is caused to increase. Due to the offsetting of the conductive substance portion 22b, the degree of entry of the conductive substance portion into the pole portions 6A-6D changes with the rotational position so that it operates in the same manner as the embodiment of FIG. 18. The offset disk of the rotor section 22 need not be the conductive substance portion in its entirety but the conductive substance portion 22b may be formed partially (e.g., annularly about the periphery of the disk) so that an eddy current path can be formed.

Figures 24, 25:
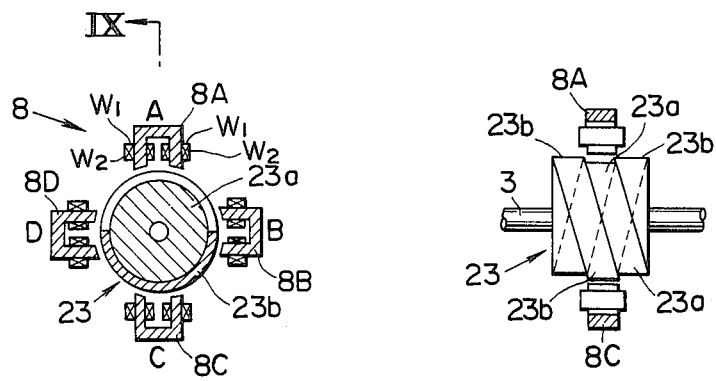
FIG. 24 is a diametrical section showing another embodiment of the invention.
FIG. 25 is a section taken along lines IX—IX in FIG. 24.

The embodiment shown in FIGS. 24 and 25 resembles the embodiment shown in FIGS. 9 and 10. A rotor section 23 comprises a cylindrical base member 23a and a spiral conductive substance portion 23b disposed in the form of a single thread screw. The larger the area of the conductive substance portion 23b facing the end surface of the respective stator pole portions 8A-8D is, the larger is the eddy current which flows, resulting in increase in the reluctance. Since the conductive substance portion 23b is spiral, the area facing the stator pole portion changes in accordance with the rotational position of the rotor section 23 and the reluctance thereby is caused to change. This embodiment therefore operates in the same manner as the embodiment of FIG. 18.

Figure 12:
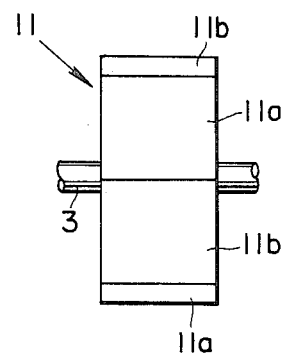
FIG. 12 is a side view of the rotor section of FIG. 11.
Figure 26:
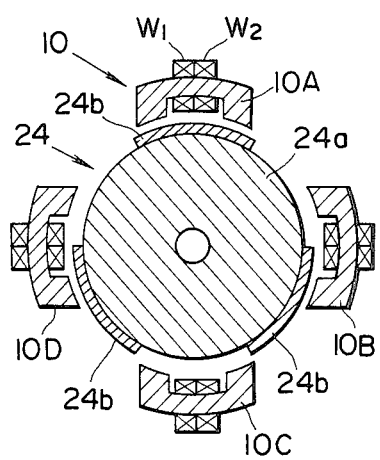
FIG. 26 is a diametrical section showing another embodiment of the invention.
Figure 27:
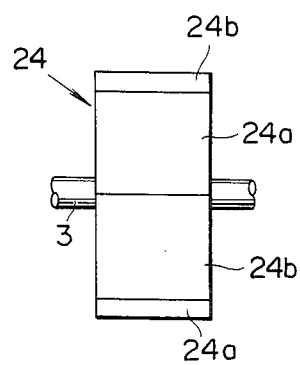
FIG. 27 is a side view of a rotor section of FIG. 26.

The embodiment of FIGS. 26 and 27 resembles the embodiment of FIGS. 11 and 12. A rotor section 24 comprises a cylindrical base member 24a and a three-piece conductive substance portion 24b disposed on the side surface thereof with a width of about 60° and at an interval of 60°. Owing to the three-piece conductive substance portion 24b disposed on the circumferential surface of the rotor section 24, reluctance changes in stator pole portions 10A-10D in such a manner that rotation of 120° constitutes one cycle of the reluctance change. Accordingly, three cycles of the reluctance change is produced for each rotation.

Figure 28:
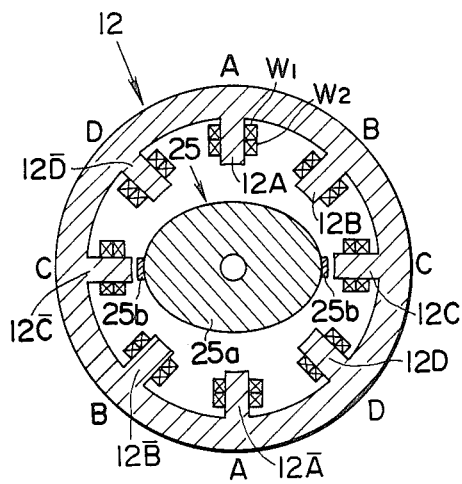
FIG. 28 is a diametrical section showing another embodiment of the invention.
Figure 29:
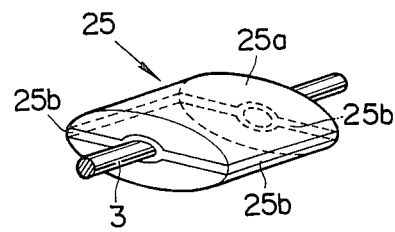
FIG. 29 is a perspective view of rotor section of FIG. 28.

The embodiment of FIGS. 28 and 29 resembles the embodiment of FIGS. 13 and 14. A rotor section 25 comprises an elliptic cylindrical base member 25a (this may be of a circular cylindrical shape) and an annular conductive substance portion 25b wound about the periphery of a plane including the major axis of the elliptic cylinder.

Figure 30:
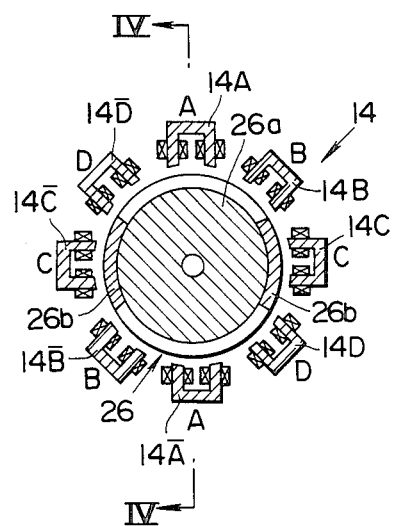
FIG. 30 is a diametrical section showing another embodiment of the invention.
Figure 31:
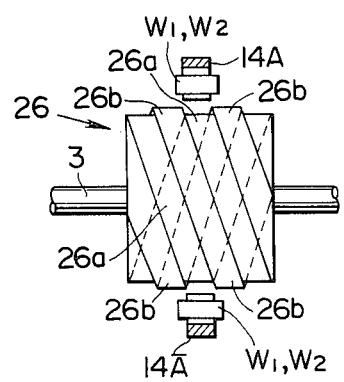
FIG. 31 is a section taken along lines IV—IV in FIG. 31.

The embodiment of FIGS. 30 and 31 resembles the embodiment of FIGS. 15 and 16. A rotor section 26 comprises a cylindrical base member 26a and a spiral conductive substance portion 26b which is disposed about the base member 26a in the form of a double thread screw. Due to the double thread construction, the reluctance change due to the change in the area of a certain pole portion opposing the conductive substance portion 26b occurs two cycles for each rotation.

In the above described embodiments, the conductive substance portion disposed in the rotor section may be made of any material that is relatively conductive compared to the base member (e.g., copper, aluminum or brass or mixture of such conductive substance and other substance). The base member of the rotor section may be made of either magnetic or non-magnetic substance. If it is made of magnetic substance, it will facilitate forming of flux.

In operating the detection device shown in FIGS. 18-31 by the above described phase shift system, the circuit shown in FIG. 17 may be employed in the same manner as described above.

The conductive substance pattern disposed in the rotor section is not limited to the one described above, but can be designed in a desired form. The conductive substance pattern in the rotor section may be formed by a suitable surface processing technique (e.g., plating, flame spraying, pattern baking, coating, welding deposition, electrotyping and photoetching) may be employed. Since a microprocessing technique has now been established according to which a minute pattern can be formed by employing such processing technique, a precise pattern can be formed by utilizing such microprocessing technique. For surface finishing of the rotor section, a coating made of a suitable non-magnetic and non-conductive substance may advantageously be applied on the conductive substance pattern in the entirety of the rotor section.

Figure 32:
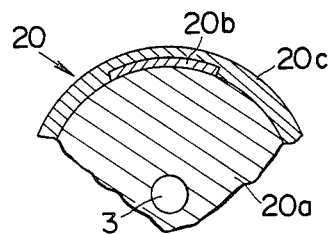
FIGS. 32, 33 and 34 are sections showing specific examples of forming a conductive substance pattern in the rotor section in FIG. 18.

FIG. 32 shows an example in which a pattern 20b is formed of a conductive substance such as copper about a base member 20a of the rotor section 20 and a surface coating 20c such as chrome plating is applied on the pattern 20b. For forming the pattern, copper plating is applied on the entire periphery of the base member 20a and thereafter an unnecessary portion of the plating is removed by a removing technique such as etching to form a desired pattern 20b by the retained copper plated portion. Finally, the surface coating 20c such as chrome plating is applied for surface finishing. A magnetic substance such as iron may advantageously be used for the base member 20a for facilitating forming of flux. Resin such as plastic or other material may also be used for the base member 20a. In the latter case, a metal film such as a copper film may be plated on the surface of a preformed plastic base member 20a or, alternatively, a metal film such as a copper film may be performed on a mold cavity and plastic material injected into the cavity to integrate the plastic with the metal film.

Figure 33:
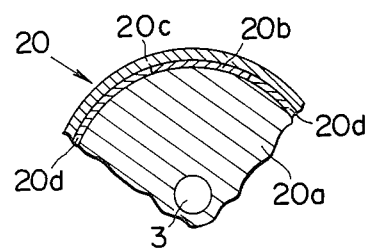

If the surface coating 20c is buried in a recess in the pattern 20b as shown in FIG. 32, the coating 20c tends to sink in this portion with resulting unevenness in the finished surface. Accordingly, a suitable filler 20d may be applied in the recess in the pattern 20b as shown in FIG. 33 and the surface coating 20c may be applied thereon. For the filler 20d, nickel plating for example may be used.

Figure 34:
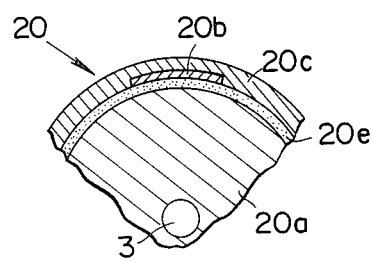

In plating the base member 20a with a metal film such as a copper film and thereafter etching with a desired pattern, there is likelihood that the surface of the base member 20a is erroded by an etching reagent. This is particularly so if the base member 20a is a metal such as iron. For overcoming such problem, a film of a predetermined substance 20e (e.g., resin) which is resistive to the etching reagent is preferably formed on the entire surface of the base member 20a as shown in FIG. 34 and plating such as copper plating is applied thereon and a predetermined etching is carried out to form the pattern 20b.

In the above described embodiments, the primary winding and the secondary winding for each phase in the stator section need not be separate windings but they may be common ones as disclosed in the Japanese Preliminary Utility Model Publication Nos. 2621/1983 or 39507/1983.

The stator section is not limited to the above described 4-pole or 8-pole type ones but may be of a pole number of any suitable integer such as 3-pole, 6-pole or 12-pole. In that case, the primary winding exciting AC signals for the phase shift system are not signals which are shifted in phase by 90° as a sine signal and a cosine signal but AC signals which are shifted in phase by 60° or its multiples such as sin $\omega t$ and sin ($\omega t - 60$), sin ($\omega t - 120$) or sin ($\omega t - 240$), or other AC signals which are shifted in phase by a suitable phase angle.

The constructions of the stator section and the rotor section are not limited to the ones shown in the above described embodiments but various modifications are possible within the scope of the appended claims.

As described above, according to the invention, the width of change in the secondary output voltage level relative to displacement can be enhanced owing to the reluctance change caused by displacement of the magnetic substance portion and the equivalent reluctance change corresponding to the eddy current loss caused by displacement of the conductive substance portion whereby accurate detection of the rotational position can be realized.

According to the invention, since the pattern of conductive substrances disposed in the rotor section and the rotational position detection signal is obtained utilizing the reluctance change corresponding to the eddy current loss caused by this arrangement, the rotor section can be made compact, the manufacturing process can be simplified and the manufacturing cost can be reduced.

What is claimed is:

1. A rotational position detection device comprising a stator section including winding means for producing a secondary output signal, said winding means being excited by one or more primary AC signals, and a rotor section disposed in such a manner that it is capable of performing relative rotational displacement with respect to said stator section, said winding means comprising a plurality of primary windings and secondary winding means, said respective primary windings being exited by primary AC signals which are shifted in phase from each other, and wherein signals derived by phase shifting said primary AC signals in response to the rotational position of said rotor section are produced from said secondary winding means, said rotor section comprising an electrically conductive substance portion provided in a predetermined pattern, wherein the conductive substance portion changes its position relative to the winding means in conjunction with rotational displacement of the rotor section and an eddy current corresponding to a relative rotational position of said rotor section with respect to said stator section flows in said electrically conductive substance portion and the secondary output signal is produced by said winding means, wherein the pattern of the conductive substance portion is configured such that the secondary output signal varies in correspondence with the relative rotational position of the conductive substance pattern of the rotor with respect to the stator section, the secondary output signal thereby being indicative of the rotor position at every rotational position of the rotor.

2. A rotational position detection device as defined in claim 1 wherein said conductive substance portion comprises a predetermined conductive substance deposited on a base member of said rotor section by a predetermined surface processing technique.

3. A rotational position detection device as defined in claim 2 wherein said predetermined pattern of electrically conductive substance is deposited by electro-plating.

4. A rotational position detection device as defined in claim 2 wherein said predetermined pattern of electrically conductive substance is deposited by flame spraying.

5. A rotational position detection device as defined in claim 2 wherein said predetermined pattern of electrically conductive substance is deposited by pattern baking.

6. A rotational position detection device as defined in claim 1 wherein said predetermined pattern of electrically conductive substance portion comprises a predetermined conductive substance deposited on a base member of said rotor section by electro-plating with an unnecessary portion of said conductive substance deposited on said base member thereafter removed, leaving said predetermined pattern of said conductive substance.

7. A rotational position detection device as defined in claim 6 wherein a predetermined coating material resistive to an agent used for removal of the unnecessary portion of said conductive substance is applied to the base member of said rotor section and said conductive substance is deposited on said base member through said coating material by the electro-plating.

8. A rotational position detection device as defined in claim 6 wherein said base member of said rotor section is made of a magnetic substance.

9. A rotational position detection device as defined in claim 6 wherein said base member of said rotor section is made of a non-magnetic and non-conductive substance.

10. A rotational position detection device as defined in claim 1 which further comprises:

AC signal generation means for generating the respective primary AC signals; and phase difference detection means for detecting phase difference between one of the primary AC signals and the secondary output signal of the secondary winding means to obtain detected phase difference data indicative of the rotational position of said rotor section.

* * * * *